(12) United States Patent
Parker

(10) Patent No.: US 9,680,870 B2
(45) Date of Patent: Jun. 13, 2017

(54) SOFTWARE-DEFINED NETWORKING GATEWAY

(71) Applicant: VERIZON PATENT AND LICENSING, INC., Basking Ridge, NJ (US)

(72) Inventor: Benjamin J. Parker, Foster City, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 396 days.

(21) Appl. No.: 13/729,968

(22) Filed: Dec. 28, 2012

(65) Prior Publication Data

US 2014/0189074 A1 Jul. 3, 2014

(51) Int. Cl.
*G06F 15/16* (2006.01)
*H04L 29/06* (2006.01)
*H04L 29/08* (2006.01)
*H04L 12/24* (2006.01)

(52) U.S. Cl.
CPC ......... *H04L 63/20* (2013.01); *H04L 41/0893* (2013.01); *H04L 67/1002* (2013.01)

(58) Field of Classification Search
CPC .. H04L 63/20; H04L 67/1002; H04L 41/0893

USPC ........................................................ 709/220
See application file for complete search history.

(56) References Cited

U.S. PATENT DOCUMENTS

| | | | |
|---|---|---|---|
| 2003/0142808 A1* | 7/2003 | Hollman et al. | 379/221.01 |
| 2006/0184694 A1* | 8/2006 | Monette et al. | 709/246 |
| 2010/0020745 A1* | 1/2010 | Agulnik | H04W 76/002 370/328 |
| 2011/0219142 A1* | 9/2011 | Lin et al. | 709/235 |
| 2011/0231536 A1* | 9/2011 | Tanaka | H04L 65/4084 709/223 |
| 2013/0103827 A1* | 4/2013 | Dunlap et al. | 709/224 |

* cited by examiner

*Primary Examiner* — Bryan Lee
*Assistant Examiner* — Oluwatosin Gidado

(57) ABSTRACT

A device determines a network attribute associated with a first network, transmits, to an orchestration device associated with a second network, information that identifies the network attribute, and receives, from the orchestration device, control information that specifies a routing policy, a security policy, or a load balancing policy associated with the first network. The device provisions network devices associated with the first network, based on the control information, and provides packets, associated with a traffic flow, to a network device, based on the control information.

20 Claims, 7 Drawing Sheets

100 ⟶

SOFTWARE-DEFINED NETWORKING GATEWAY

BACKGROUND

Software-defined networking is an approach to networking in which control of network devices is decoupled from hardware, and may be supplied to the hardware through instructions received from a software application. Software-defined networking allows network administrators to use less expensive commodity hardware and have more control over network traffic that is processed by the hardware.

DETAILED DESCRIPTION OF PREFERRED EMBODIMENTS

The following detailed description of example implementations refers to the accompanying drawings. The same reference numbers in different drawings may identify the same or similar elements.

In software-defined networking, a network administrator may use a software application to send instructions to a network device that processes network traffic. The instructions may control the manner in which the network device processes the network traffic. For example, the instructions may include instructions for routing traffic, prioritizing traffic, translating traffic between network protocols, etc. Implementations described herein may allow a network administrator to have more control over the manner in which network traffic is handled by network devices.

Figure 1:
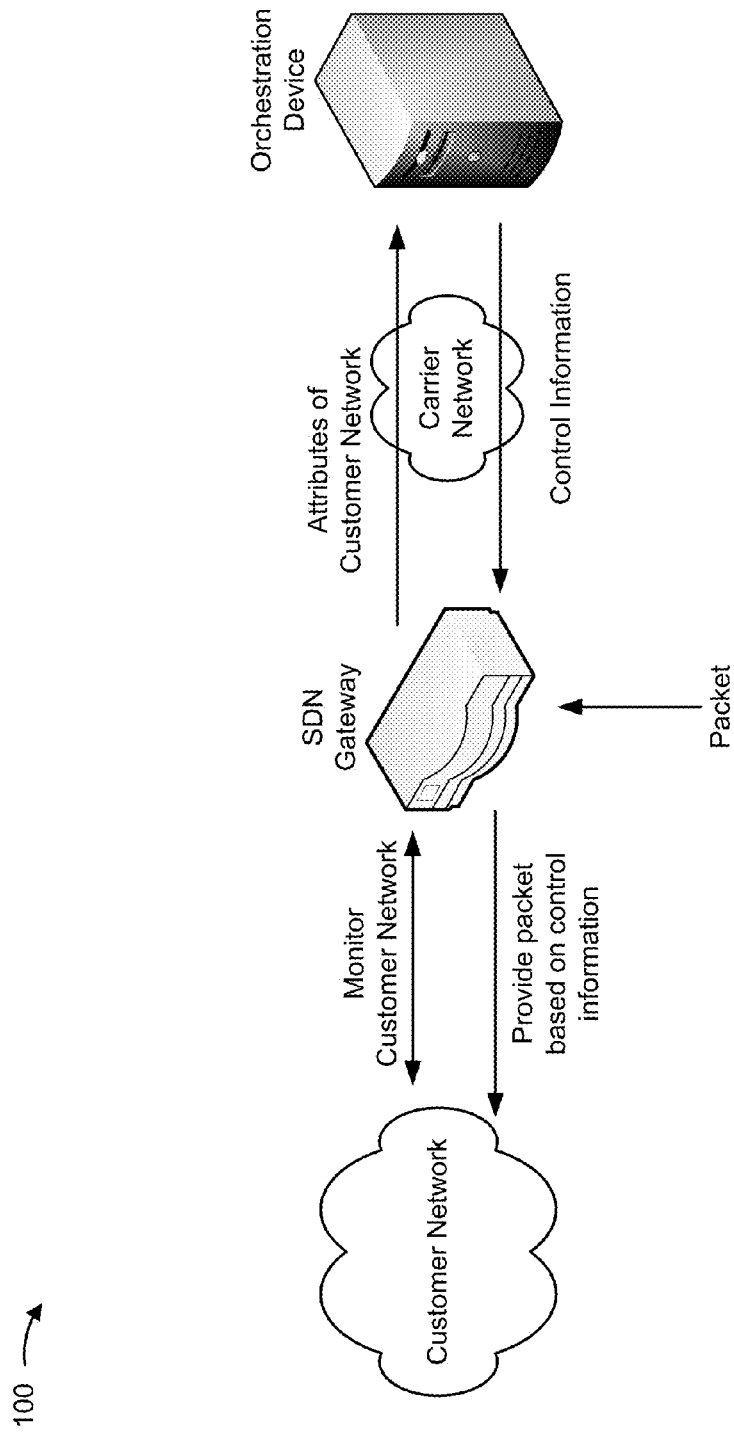
FIG. 1 is a diagram of an overview of an example implementation described herein.

FIG. 1 is a diagram of an overview of an example implementation 100 described herein. As shown in FIG. 1, example implementation 100 may include a customer network, a software-defined networking (SDN) gateway, a carrier network, and an orchestration device. The customer network may include a private network, the SDN gateway may include a traffic transfer device, such as a gateway or a router, the carrier network may include a telecommunications service provider network, and the orchestration device may include a server. The orchestration device and the SDN gateway may communicate via the carrier network.

As further shown in FIG. 1, the SDN gateway may monitor the customer network, and may transmit, to the orchestration device, information that identifies one or more attributes of the customer network. The attributes may include, for example, a condition of the customer network (e.g., network load, network congestion, etc.), a capability of the customer network (e.g., a bandwidth supported by the network, a protocol supported by the network, etc.), a structure of the network (e.g., information about network devices that route traffic through the network, information about links between the network devices, etc.), or other information associated with the customer network. The orchestration device may receive the attributes, and may generate control information based on the attributes. The control information may include, for example, a routing policy, a security policy, a load balancing policy, etc. to be applied by the SDN gateway.

The SDN gateway may receive the control information, and may control traffic processing policies based on the control information. For example, the SDN gateway may receive a packet, and may provide the packet to the customer network based on the control information. In some implementations, the SDN gateway may provision network devices on the customer network based on requirements associated with the packet and identified by the control information, and may route the packet to a destination device via the provisioned network devices. In some implementations, the SDN gateway may determine the control information in addition to or as an alternative to receiving the control information from the orchestration device.

Figure 2:
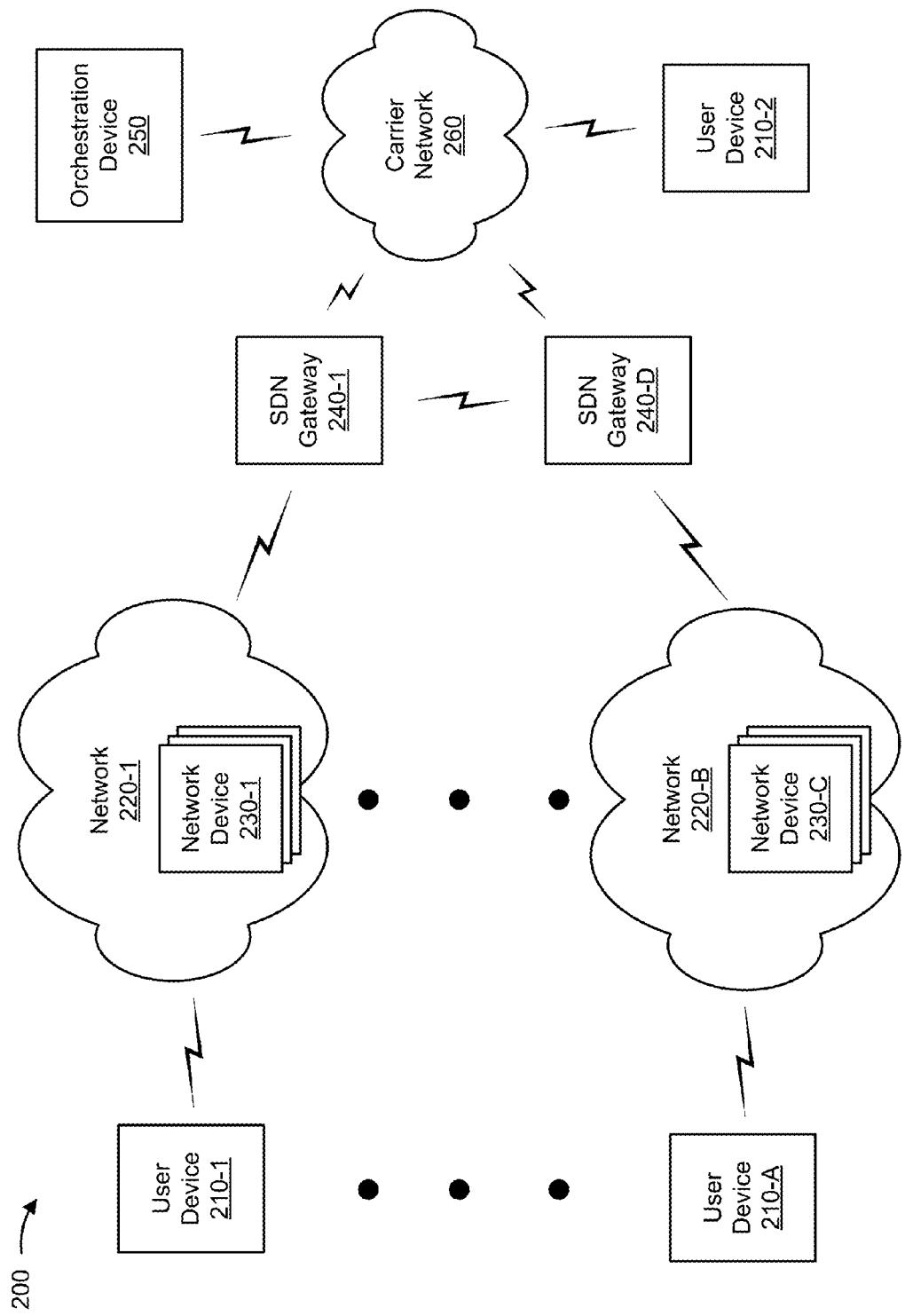
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more user devices 210-1, 210-2, through 210-A (A≥1) (hereinafter referred to collectively as "user devices 210," and individually as "user device 210"), one or more networks 220-1 through 220-B (B≥1) (hereinafter referred to collectively as "networks 220," and individually as "network 220"), one or more network devices 230-1 through 230-C (C≥1) (hereinafter referred to collectively as "network devices 230," and individually as "network device 230"), one or more software-defined networking (SDN) gateways 240-1 through 240-D (D≥1) (hereinafter referred to collectively as "SDN gateways 240," and individually as "SDN gateway 240"), an orchestration device 250, and a carrier network 260. The devices of environment 200 may interconnect (e.g., via networks 220 and/or carrier network 260) via wired connections, wireless connections, or a combination of wired and wireless connections.

User device 210 may include a device capable of accessing network 220 and/or carrier network 260 and communicating with one or more devices shown in FIG. 2. For example, user device 210 may include a server, a desktop computer, a laptop computer, a tablet computer, a handheld computer, a smart phone, a radiotelephone, a gaming system, a set-top box, or a similar device. In some implementations, user device 210 may communicate with other devices via network 220. Additionally, or alternatively, user device 210 may communicate with other devices via carrier network 260.

Network 220 may include one or more wired and/or wireless private networks. For example, network 220 may include a local area network (LAN), a wide area network (WAN), a metropolitan area network (MAN), an intranet, and/or another type of private network. Alternatively, network 220 may include a public network in some implementations. In some implementations, network 220 may include a customer network, a network that connects devices of a data center, a third party network, etc. Additionally, or alternatively, network 220 may include an autonomous system (e.g., a collection of connected Internet protocol (IP) routing prefixes, under the control of a network operator, that presents a common, clearly defined routing policy). In some implementations, different networks 220 may utilize different communication protocols to process network traffic. Network 220 may include a software-defined network or a non-software-defined network.

Network device 230 may include one or more traffic transfer devices. For example, network device 230 may include a router, a switch, a firewall, a hub, a bridge, a gateway, a modem, a network interface card (NIC), an optical add-drop multiplexer (OADM), a server, and/or another device capable of transmitting, receiving, transferring, and/or processing network traffic. Network device 230 may transfer traffic between and/or among the devices shown in FIG. 2. In some implementations, network device 230 may be configured to process traffic according to configuration policies associated with network 220. For example, network devices 230 in different networks 220 may be configured to process traffic in a different manner and/or using different protocols.

SDN gateway 240 may include one or more traffic transfer devices. For example, SDN gateway 240 may include a gateway, a router, a switch, a firewall, a hub, a bridge, a virtual private network (VPN) concentrator, a modem, a network interface card (NIC), an optical add-drop multiplexer (OADM), a server, and/or another device capable of transmitting, receiving, transferring, and/or processing network traffic. SDN gateway 240 may receive traffic from one or more networks 220/260, and may provide the traffic to one or more other networks 220/260 (e.g., by multiplexing traffic onto one or more transport links associated with other networks 220/260). For example, SDN gateway 240 may include an edge device, such as an edge router or an edge gateway, and may transfer traffic between network 220 (e.g., a customer network) and carrier network 260 (e.g., a provider network).

In some implementations, a first SDN gateway 240 may be capable of performing the functions performed by a second SDN gateway 240 to support redundancy, so that if the first SDN gateway 240 becomes inoperable, the second SDN gateway 240 may take over the functions of the first SDN gateway 240. In some implementations, SDN gateway 240 may provide the functionality described herein via software, so that SDN gateway 240 may include less expensive commodity hardware than is typically found in a gateway.

Orchestration device 250 may include a computing device capable of receiving input and/or communicating with SDN gateway 240 (e.g., via carrier network 260). For example, orchestration device 250 may include a server, a desktop computer, a laptop computer, a tablet computer, a handheld computer, a smart phone, or a similar device. In some implementations, orchestration device 250 may communicate with SDN gateway 240 to receive information associated with network 220 (e.g., a condition of network 220, a capability of network 220, etc.) and/or to provide information associated with network 220 (e.g., control information that identifies a policy for routing packets through network 220). Although orchestration device 250 is shown as communicating with SDN gateway 240 via carrier network 260, in some implementations, one or more orchestration devices 250 may communicate with SDN gateway 240 via one or more networks 220.

Carrier network 260 may include one or more wired and/or wireless service provider networks. For example, carrier network 260 may include a cellular network, a public land mobile network (PLMN), a radio access network (RAN), a long term evolution (LTE) network, a second generation (2G) network, a third generation (3G) network, a fourth generation (4G) network, a fifth generation (5G) network, and/or another type of service provider network, or a combination of wired and wireless networks. Additionally, or alternatively, carrier network 260 may include a LAN, a WAN, a MAN, an intranet, and/or another type of network. In some implementations, carrier network 260 may utilize a different network protocol (e.g., a software-defined networking protocol, such as an OpenFlow protocol) than a protocol utilized by network 220 when network 220 processes network traffic.

The number of devices/networks shown in FIG. 2 is provided as an example. In practice, environment 200 may include additional devices/networks, fewer devices/networks, different devices/networks, or differently arranged devices/networks. Furthermore, two or more devices shown in FIG. 2 may be implemented within a single device, or a single device shown in FIG. 2 may be implemented as multiple, possibly distributed devices. Additionally, one or more of the devices of environment 200 may perform one or more functions described as being performed by another one or more devices of environment 200.

Figure 3:
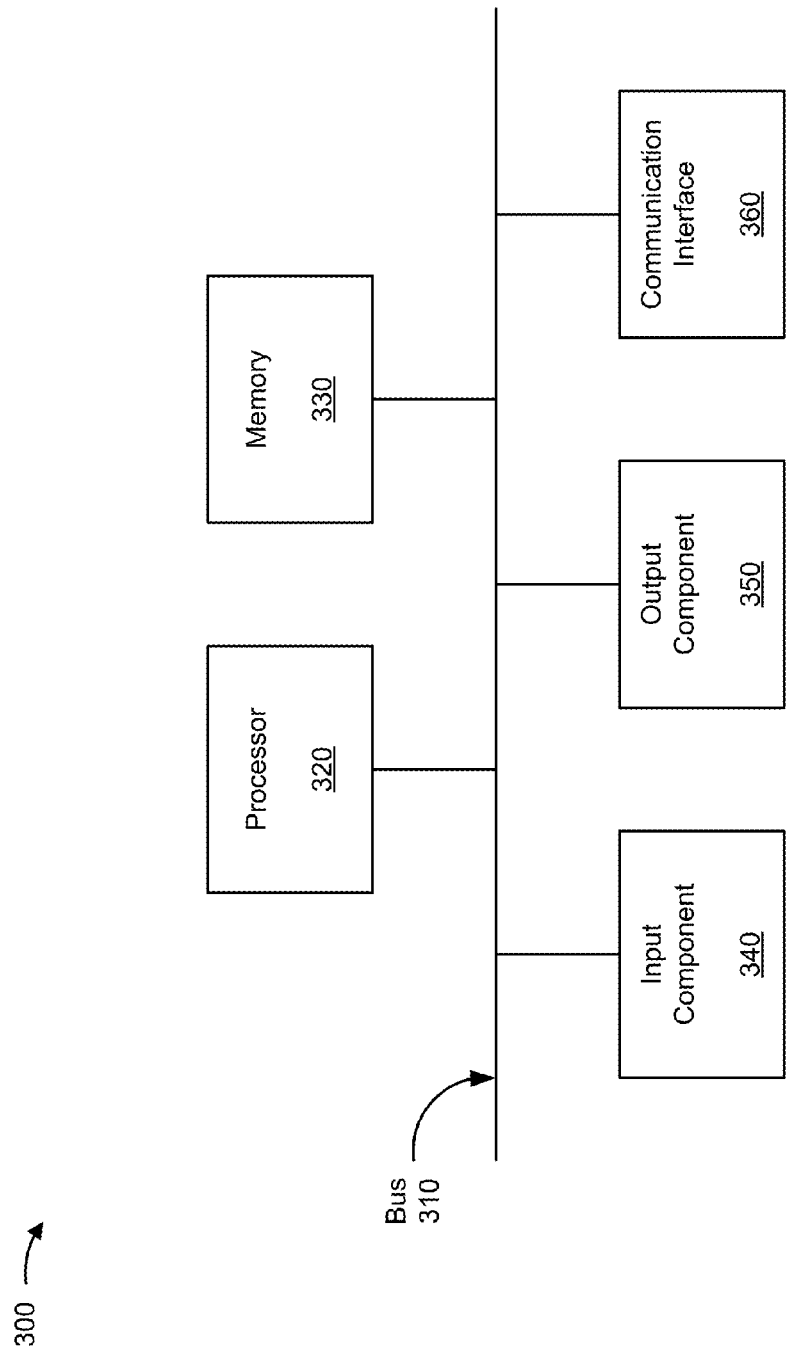
FIG. 3 is a diagram of example components of one or more devices of FIG. 2.

FIG. 3 is a diagram of example components of a device 300, which may correspond to user device 210, network device 230, SDN gateway 240, and/or orchestration device 250. In some implementations, each of user device 210, network device 230, SDN gateway 240, and/or orchestration device 250 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
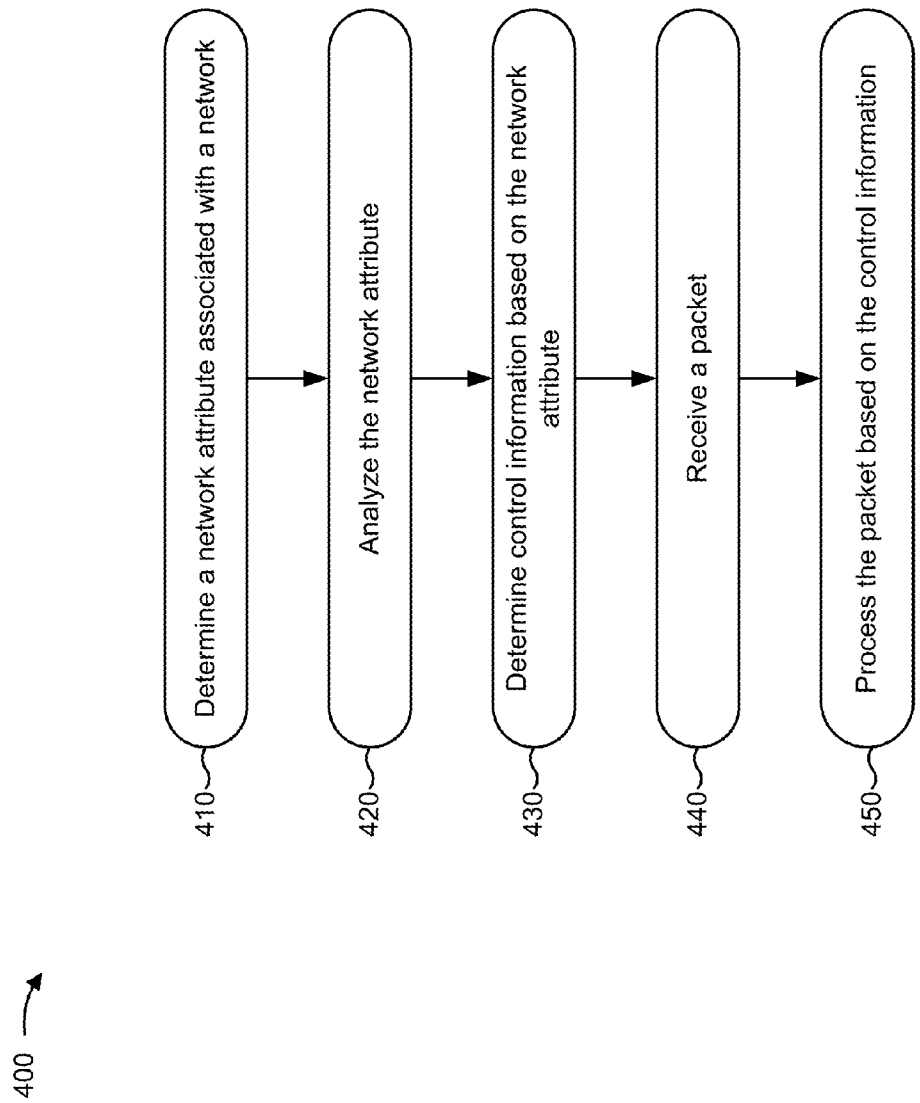
FIG. 4 is a flow chart of an example process for controlling packet processing using a software-defined networking gateway.

FIG. 4 is a flow chart of an example process 400 for controlling packet processing using a software-defined networking gateway. In some implementations, one or more process blocks of FIG. 4 may be performed by SDN gateway 240. Additionally, or alternatively, one or more process blocks of FIG. 4 may be performed by another device or a group of devices separate from or including SDN gateway 240, such as network device 230 and/or orchestration device 250.

As shown in FIG. 4, process 400 may include determining a network attribute associated with a network (block 410). For example, SDN gateway 240 may determine a network attribute associated with network 220. In some implementations, SDN gateway 240 may periodically receive the network attribute, from one or more network devices 230.

The network attribute may identify, for example, a condition of network 220, a capability of network 220, a structure of network 220, or other information associated with network 220. For example, the network attribute may identify an amount of traffic and/or a bandwidth being utilized by network devices 230, a traffic and/or bandwidth utilization rate of network devices 230, an amount of traffic and/or a bandwidth supported by network devices 230, a protocol supported by network devices 230, a quantity and/or type of one or more network devices 230 in network 220, a quantity and/or type of link between network devices 230 in network 220, a quantity of traffic flows on a link and/or between network devices 230, a bandwidth and/or traffic capacity of a link between network devices 230, a packet loss associated with a traffic flow on network 220, a jitter associated with a traffic flow on network 220, a latency associated with a traffic flow on network 220, a duration of a traffic flow on network 220, transmission control protocol (TCP) information associated with a traffic flow on network 220 (e.g., window size, retransmission rate, round-trip time, etc.), whether a route to a particular network device 230 and/or user device 210 is available, a quantity of available routes to a particular network device 230 and/or user device 210, a network service provider and/or operator associated with network 220, a cost associated with routing traffic via network 220, information associated with packets received and/or routed by SDN gateway 240, or other information associated with network 220, a network device 230, a link between network devices 230, and/or a traffic flow between network devices 230.

As used herein, a link may refer to a physical or logical connection between two or more network devices 230. As used herein, a traffic flow may refer to communication of information (e.g., via a packet) between two or more network devices 230.

As further shown in FIG. 4, process 400 may include analyzing the network attribute (block 420). For example, SDN gateway 240 may analyze the network attribute to determine a network topology. In some implementations, SDN gateway 240 may transmit the network attribute to another device (e.g., orchestration device 250) for analysis.

In some implementations, SDN gateway 240 may determine a network topology of network 220. The network topology may identify network devices 230 included in network 220, links between network devices 230, traffic flows on the links, and/or information associated with network devices 230, the links, and/or the traffic flows. For example, the network topology may identify an amount of bandwidth consumed by a network device 230 and/or a link, an amount of bandwidth available on a network device 230 and/or a link, a jitter associated with a network device 230 and/or a link, a latency associated with a network device 230 and/or a link, a path diversity between network devices 230 and/or links (e.g., a quantity of paths that can be used to route information between two or more network devices 230), an average packet loss of a traffic flow between network devices 230, an average duration of a traffic flow between network devices 230, and/or other network attributes associated with network 220.

SDN gateway 240 may compare one or more network attributes to one or more thresholds, and may provide an alert (e.g., to a user interface of SDN gateway 240 and/or orchestration device 250) when the one or more network attributes satisfies the one or more thresholds. In some implementations, SDN gateway 240 may provide an alert associated with a first network (e.g., network 220) to a device, such as orchestration device 260, associated with a second network (e.g., carrier network 260). Additionally, or alternatively, SDN gateway 240 may provide an alert associated with the second network (e.g., carrier network 260) to a device, such as network device 230 and/or a monitoring device, associated with the first network (e.g., network 220).

In some implementations, SDN gateway 240 may collect and/or analyze a network attribute using one or more network management protocols, such as simple network management protocol (SNMP), Syslog, NetFlow, information protocol flow information export (IPFIX), structured information (e.g., in a packet header) from user datagram protocol (UDP), TCP, hypertext transfer protocol (HTTP) (e.g., structured via representational state transfer (REST) architecture), or another protocol.

As shown in FIG. 4, process 400 may include determining control information based on the network attribute (block 430). For example, SDN gateway 240 may determine the control information based on the analysis of the network attribute. In some implementations, orchestration device 250 may determine the control information (e.g., based on receiving the network attribute from SDN gateway 240 and/or analyzing the network attribute), and may transmit the control information to SDN gateway 240.

The control information may identify instructions for controlling traffic processed by SDN gateway 240 and/or network devices 230. For example, the control information may include a routing policy, a security policy, a load balancing policy, etc. In some implementations, SDN gateway 240 may provide, on a user interface, a depiction of a network topology of network 220, and may receive control information based on a user interaction with the user interface. The user interface may be provided, for example, on SDN gateway 240 and/or orchestration device 250. In some implementations, the network topology depiction may indicate an amount of traffic on different network devices 230 and/or links. SDN gateway 230 may receive information that identifies a user selection of one or more network devices 230 and/or links to be used to process particular network traffic.

As shown in FIG. 4, process 400 may include receiving a packet (block 440), and processing the packet based on the control information (block 450). For example, SDN gateway 240 may receive a packet, and may process the packet based on the control information, such as a routing policy. In some implementations, the control information may include identification information that may be used to identify a packet as being associated with the control information. When SDN gateway 240 receives a packet, SDN gateway 240 may use the identification information to determine whether the packet is to be controlled based on the control information. For example, SDN gateway 240 may analyze a packet header to determine whether information in the packet header matches the identification information. If the information in the packet header matches the identification information, then SDN gateway 240 may process the packet based on the control information.

SDN gateway 240 may apply a routing policy to the packet, in some implementations. For example, SDN gateway 240 may use the routing policy to determine a route that the packet should take, through network 220, to reach a destination device (e.g., user device 210). The routing policy may include a route through specific network devices 230 and/or links, and/or may include a route based on network attributes, such as a bandwidth and/or a utilization rate associated with a network device 230 and/or a link. In some implementations, the control information may identify one or more criteria for routing a packet (e.g., cost, throughput, speed, duration, packet loss, jitter, latency, delay, etc.), and SDN gateway 240 may route the packet based on the criteria.

Additionally, or alternatively, SDN gateway 240 may provision one or more network devices 230 for routing the packet. For example, SDN gateway 240 may send routing instructions to network device 230, and network device 230 may route the packet based on the routing instructions. The routing instructions may identify the packet, may identify a next network device 230 (e.g., a next hop) to which the network device 230 is to forward the packet, may identify a bandwidth to allocate to the packet and/or a traffic flow that includes the packet, etc. In some implementations, SDN gateway 240 may use border gateway protocol (BGP) and/or interior gateway protocol to process traffic.

SDN gateway 240 may apply a security policy to the packet, in some implementations. For example, SDN gateway 240 may hide the network topology of a first network (e.g., carrier network 260) from a second network (e.g., network 220) to prevent malicious attacks. In some implementations, SDN gateway 240 may act as a connection destination point for the first network (e.g., a destination point for a TCP connection, an IP security (IPsec) session, a signaling connection, a tunnel, a VPN tunnel, etc.), and may act as a connection source point for the second network (e.g., a source point for a TCP connection, an IPsec session, a signaling connection, a tunnel, a VPN tunnel etc.). For example, SDN gateway 240 may receive a packet via a first connection with the first network, may modify the packet for transmission over the second network (e.g., by modifying the packet, the packet header, performing a header fix-up, etc.), and may transmit the packet via a second connection with the second network.

Additionally, or alternatively, SDN gateway 240 may perform network address translation (NAT), such as by modifying IP address information in the packet header while routing the packet from the first network to the second network. Additionally, or alternatively, SDN gateway 240 may establish a VPN session and/or an IPsec session for a traffic flow that includes the packet, such as by authenticating and encrypting the packet (and other packets transmitted in the session).

Additionally, or alternatively, SDN gateway 240 may protect a network from inappropriate or malicious traffic. For example, SDN gateway 240 may drop packets and/or reject signaling instructions from an unauthorized source. In some implementations, SDN gateway 240 may store, in a data structure, information that identifies authorized and/or unauthorized sources. SDN gateway 240 may compare information that identifies a source of a packet (e.g., identified in the packet header) to information stored in the data structure to determine whether to drop, ignore, or reject the packet and/or an instruction carried by the packet. In some implementations, SDN gateway 240 may protect a network from a denial-of-service (DoS) attack and/or a distributed denial-of-service (DDoS) attack by dropping, rejecting, and/or queuing packets when a number of received packets, signals, and/or messages per time interval surpasses a threshold.

SDN gateway 240 may apply a load balancing policy to the packet, in some implementations. For example, SDN gateway 240 may provision network devices 230 to route a packet to a destination device (e.g., user device 210) based on a load balancing algorithm, such as by routing a packet to a particular network device 230 selected using a round robin algorithm, a least load first algorithm (e.g., routing the packet to an available network device 230 processing the least amount of traffic, routing the traffic via a link carrying the least amount of traffic, etc.), a shortest path algorithm (e.g., a series of network devices 230 that provides the shortest, quickest, least costly, etc. route to a destination device), etc. Additionally, or alternatively, SDN gateway 240 may support TCP tuning techniques that may adjust the network congestion avoidance parameters of TCP connections (e.g., over a high bandwidth, high latency network). For example, SDN gateway 240 may receive information that identifies desired TCP parameters (e.g., from orchestration device 250), and may modify the TCP parameters of a packet based on the desired TCP parameters.

In some implementations, SDN gateway 240 may reroute a traffic flow. For example, if SDN gateway 240 determines that a network attribute associated with a first route (e.g., a first VPN), via which a traffic flow is provided, satisfies a threshold, then SDN gateway 240 may reroute the traffic flow using a second route (e.g., a second VPN). For example, if a packet delay, a flow duration, a latency, a jitter, etc., associated with the first route, surpasses a threshold, and/or if a speed, transmission rate, bandwidth, etc., associated with the first route, falls below a threshold, then SDN gateway 240 may determine a second route for the traffic flow. In some implementations, SDN gateway 240 may establish the second route, may test the second route to ensure that the second route satisfies one or more criteria, and may terminate the first route (e.g., may route the traffic flow via the second route rather than the first route) based on determining that the second route satisfies the criteria. In this way, SDN gateway 240 may support a make-before-break transition of a traffic flow from a first route to a second route. Additionally, or alternatively, SDN gateway 240 may drop, reject, and/or queue packets (e.g., in an ingress queue and/or an egress queue, based on priority) when a network attribute, associated with a route, satisfies a threshold.

Figure 5A:
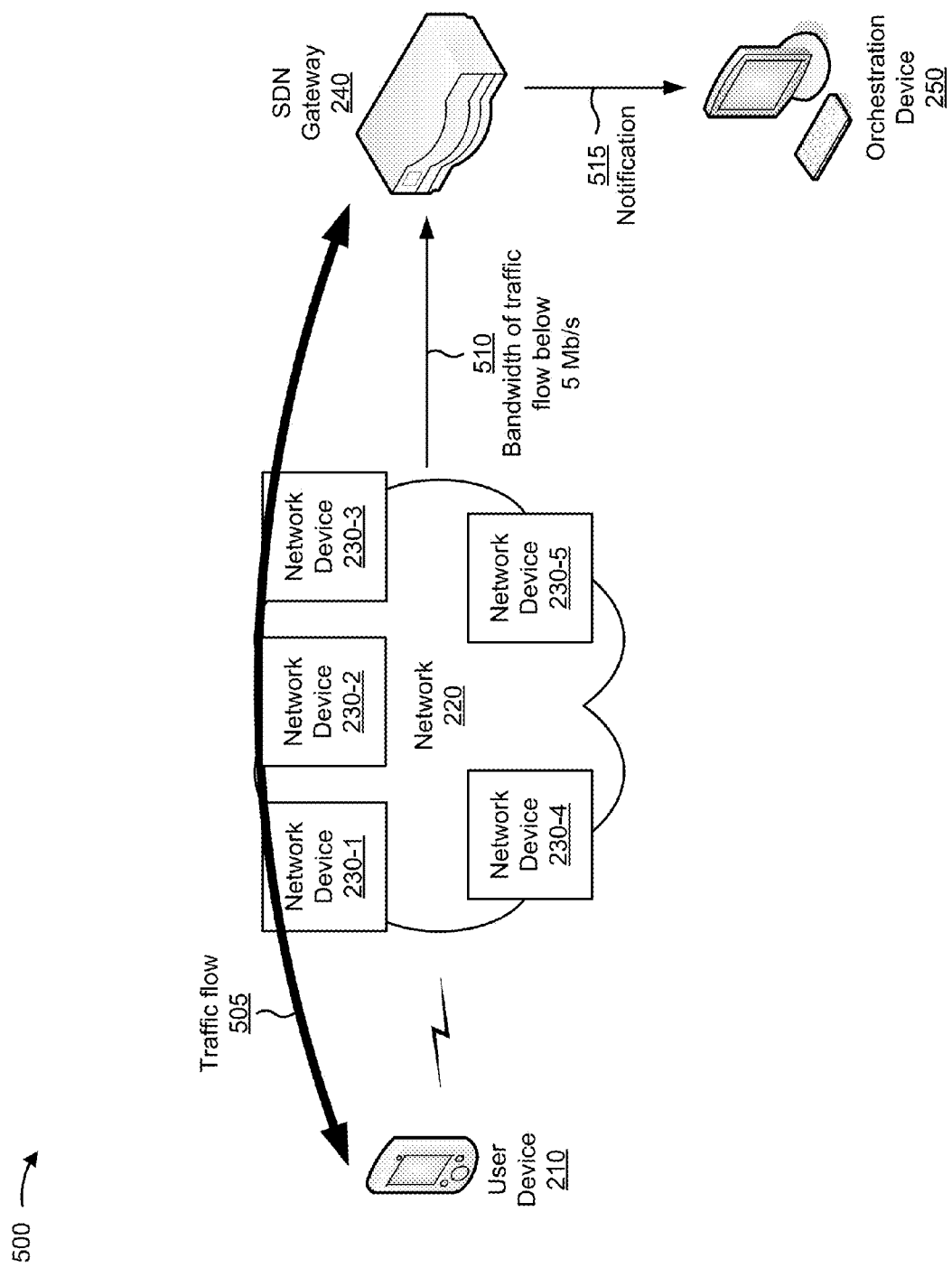
FIGS. 5A-5C are diagrams of an example implementation relating to the example process shown in FIG. 4.
Figure 5B:
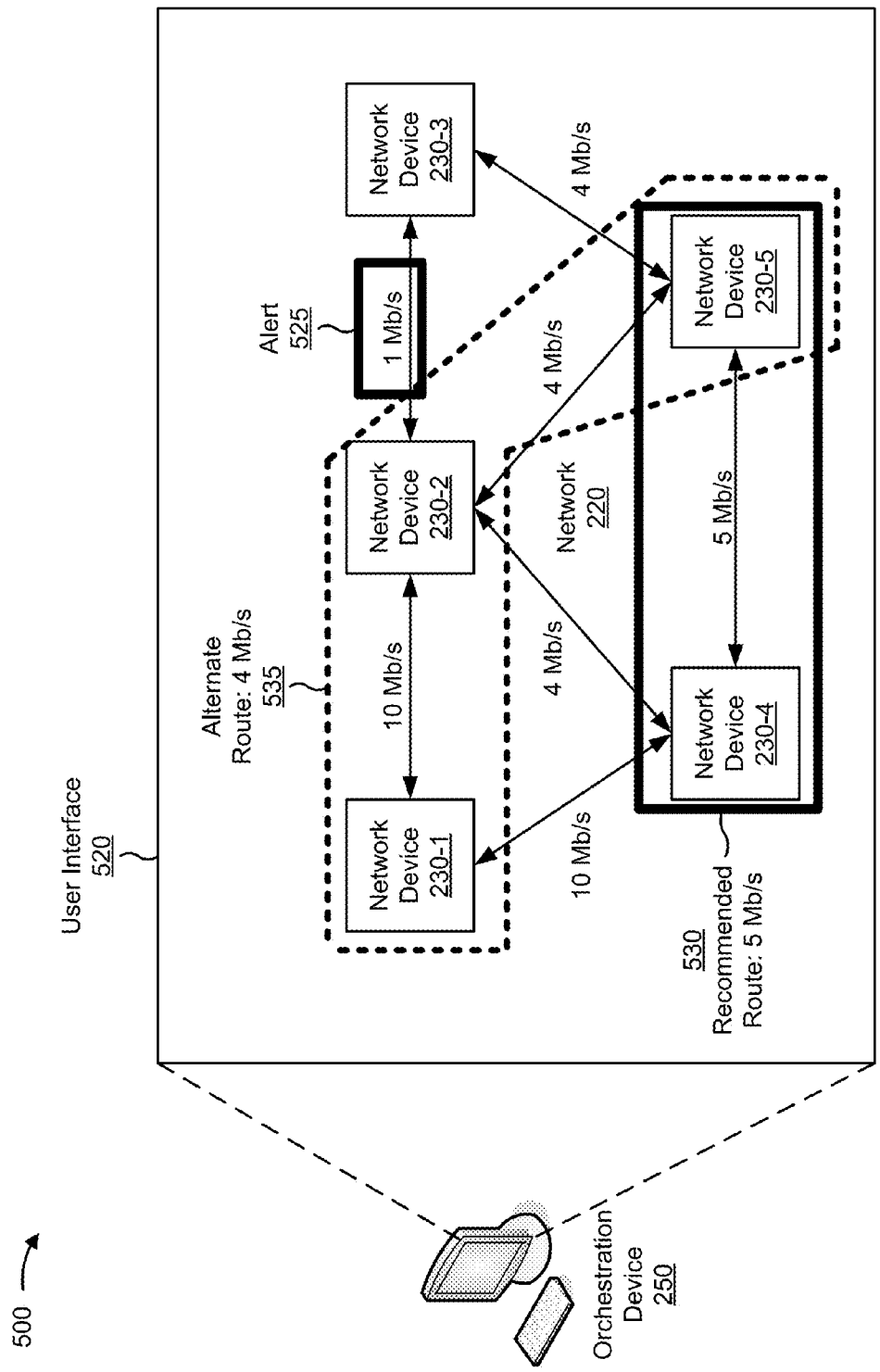
Figure 5C:
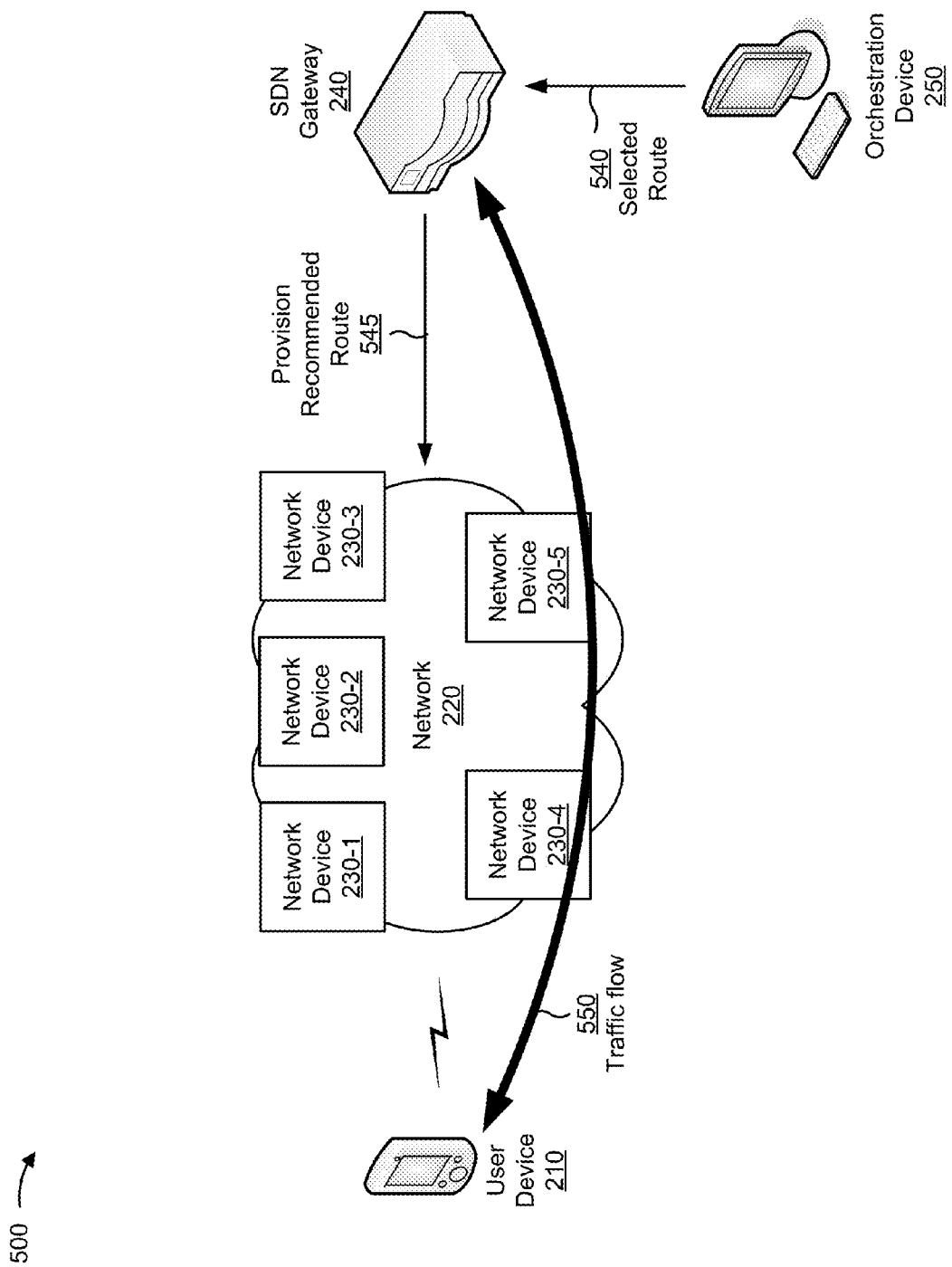

FIGS. 5A-5C are diagrams of an example implementation 500 relating to example process 400 of FIG. 4. FIGS. 5A-5C depict example implementation 500 where SDN gateway 240 detects a problem with a traffic flow over network 220, determines an alternate route for routing the traffic flow over network 220, and provisions network devices 230 of network 220 to re-route the traffic flow.

As shown in FIG. 5A, a traffic flow between user device 210 and SDN gateway 240 may be routed over network 220 via network devices 230-1, 230-2, and 230-3, as shown by reference number 505. As shown by reference number 510, SDN gateway 240 may determine that a bandwidth of the traffic flow has fallen below five megabits per second (5 Mb/s). For example, SDN gateway 240 may periodically request and/or receive network attributes from network devices 230 and/or a monitoring device, associated with network 220, that monitors network devices 230. SDN gateway 240 may determine that over some time interval (e.g., the past 5 minutes), the average bandwidth of the traffic flow over network devices 230-1, 230-2, and 230-3 is below 5 Mb/s. As shown by reference number 515, SDN gateway 240 may send a notification, to orchestration device 250, indicating that bandwidth of the traffic flow is below 5 Mb/s. SDN gateway 240 may also transmit, to orchestration device 250, a network topology of network 220.

As shown in FIG. 5B, orchestration device 250 may receive the notification, and may provide, via a user interface 520, a representation of the network topology. For example, user interface 520 may depict a representation of network 220, network devices 230 (e.g., network devices 230-1, 230-2, 230-3, 230-4, and 230-5, as shown), and links between network devices 230. In some implementations, user interface 520 may depict multiple networks 220/260, and may depict information associated with multiple networks 220/260. Additionally, or alternatively, SDN gateway 240 may provide user interface 520.

In some implementations, a depicted link may represent a physical link, such as a cable, a fiber (e.g., an optical fiber), a wire, or other physical hardware that connects network devices 230. Additionally, or alternatively, a depicted link may represent a logical link, such as a connection (e.g., a TCP connection, a UDP connection, etc.) between network devices 230. For example, the link may represent a connection between a source port or socket on a first network device 230 and a destination port or socket on a second network device 230. In some implementations (e.g., where a link represents a logical link), user interface 520 may depict multiple links between network devices 230.

Orchestration device 250 may also provide, via user interface 520, information associated with network 220, network devices 230, and/or links between network devices 230. In some implementations, user interface 520 may depict one or more network attributes, and/or results of an analysis of one or more network attributes, associated with network 220, network device 230, and/or a link between network devices 230. For example, user interface 520 may depict information that identifies a bandwidth associated with a link between network devices 230.

As shown, the bandwidth of a link between network devices 230-1 and 230-2 may be 10 Mb/s, the bandwidth of a link between network devices 230-1 and 230-4 may be 10 Mb/s, the bandwidth of a link between network devices 230-2 and 230-3 may be 1 Mb/s, the bandwidth of a link between network devices 230-2 and 230-4 may be 4 Mb/s, the bandwidth of a link between network devices 230-2 and 230-5 may be 4 Mb/s, the bandwidth of a link between network devices 230-3 and 230-5 may be 4 Mb/s, and the bandwidth of a link between network devices 230-4 and 230-5 may be 5 Mb/s.

As shown by reference number 525, user interface 520 may provide an alert 525 that indicates a problem associated with a traffic flow over network 220. Alert 525 may be based on the notification and the network topology information received from SDN gateway 240. For example, user interface 520 may provide alert 525 that indicates that the reason the bandwidth of the traffic flow has fallen below 3 Mb/s may be due to a bandwidth of 1 Mb/s between network devices 230-2 and 230-3. To provide alert 525, user interface 520 may highlight, circle, provide a text alert, provide an image alert, etc., on a depicted link and/or network device 230 associated with the problem. For example, user interface 520 may provide a box around the problematic link between network devices 230-2 and 230-3, as shown.

As shown by reference number 530, orchestration device 250 may provide, on user interface 520 and based on the network topology received from SDN gateway 240, a recommended route for the traffic flow. For example, SDN gateway 240 and/or orchestration device 250 may determine a route that provides the highest bandwidth when compared to available routes. In example implementation 500, orchestration device 250 may provide a recommendation that the traffic flow be routed via network devices 230-4 and 230-5, which provide a bandwidth of 5 Mb/s.

To indicate the recommended route, orchestration device 250 may highlight, circle, provide a text alert, provide an image alert, etc., on user interface 520, associated with a depicted link(s) and/or network device(s) 230 included in the recommended route. For example, user interface 520 may provide a box around network devices 230-4 and 230-5, as shown. Furthermore, user interface 520 may provide one or more network attributes associated with the recommended route, such as a bandwidth associated with the recommended route (e.g., 5 Mb/s, as shown).

As shown by reference number 535, orchestration device 250 may provide, on user interface 520 and based on the network topology received from SDN gateway 240, an alternate route for the traffic flow. For example, SDN gateway 240 and/or orchestration device 250 may determine one or more routes other than the recommended route, such as an available route and/or a route associated with a network attribute that satisfies a threshold (e.g., a bandwidth greater than 3 Mb/s). In example implementation 500, orchestration device 250 may provide an indication that the traffic flow may be routed over an alternate route via network devices 230-1, 230-2, and 230-5, which provide a bandwidth of 4 Mb/s (e.g., based on a bottleneck bandwidth of 4 Mb/s between network devices 230-2 and 230-5).

To indicate the alternate route, orchestration device 250 may highlight, circle, provide a text alert, provide an image alert, etc., on user interface 520, associated with a depicted link(s) and/or network device(s) 230 included in the alternate route. For example, user interface 520 may provide a box around network devices 230-1, 230-2, and 230-5, as shown. Furthermore, user interface 520 may provide one or more network attributes associated with the alternate route, such as a bandwidth associated with the alternate route (e.g., 4 Mb/s, as shown). In some implementations, user interface 520 may represent the recommended route and the alternate route in a different manner, as shown by the solid box around the recommended route, and the dashed box around the alternate route.

In some implementations, orchestration device 250 may receive a user selection of a route, one or more network devices 230, and/or one or more links via which to route the traffic flow. Alternatively, SDN gateway 240 and/or orchestration device 250 may automatically select a route without user interaction. For example, SDN gateway 240 may automatically select a route based on one or more network attributes associated with the route (e.g., may automatically select a recommended route and/or an alternate route).

As shown in FIG. 5C, orchestration device 250 may provide information that identifies the selected route to SDN gateway 240, as shown by reference number 540. As shown by reference number 545, SDN gateway 240 may provision network devices 230, included in the selected route, to route the traffic flow. SDN gateway 240, network device 230-4, and/or network device 230-5 may route packets associated with the traffic flow over the selected route, as shown by reference number 550.

In some implementations, SDN gateway 240 may establish the selected route, and may test the selected route to determine whether one or more network attributes associated with the selected route satisfy one or more criteria (e.g., a bandwidth greater than 3 Mb/s, a bandwidth greater than the previous route, etc.). If SDN gateway 240 determines that the network attributes of the selected route satisfy the criteria, then SDN gateway 240 may terminate the previous route (e.g., the route shown by reference number 505, FIG. 5A). If SDN gateway 240 determines that the network attributes of the selected route do not satisfy the criteria, then SDN gateway 240 may transmit information to orchestration device 250 for the selection of another route (e.g., an alternate route), may select an alternate route (e.g., by establishing and/or testing the alternate route), and/or may maintain the previous route.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

The term "packet," as used herein, may refer to a packet, a datagram, a cell, a fragment of a packet, a fragment of a datagram, a fragment of a cell, or any other type or arrangement of data that may be carried at a specified communication layer.

Some implementations have been described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein. In some implementations, the user interfaces may be customizable by a user and/or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A gateway device comprising:
one or more processors to:
  receive, from a user device, information transmitted from the user device to a plurality of network devices associated with a first network,
    the information being transmitted to the plurality of network devices before being received by the gateway device;
  determine, based on receiving the information, a network attribute associated with the first network;
  transmit, to an orchestration device associated with a second network, information that identifies the network attribute;
  receive, from the orchestration device, control information that specifies a routing policy, a security policy, or a load balancing policy associated with the first network;
  provision the plurality of network devices for routing one or more packets to a destination device based on the control information,
    the destination device being different than the plurality of network devices,
    the plurality of network devices being provisioned based on information that identifies a first group of network devices, of the plurality of network devices, used for transmitting the one or more packets,
      the first group of network devices being determined based on information associated with a second group of network devices of the plurality of network devices,
      the first group of network devices being included in a different route to the destination device than the second group of network devices,
      the second group of network devices being different than the first group of network devices, and
      the second group of network devices including at least one network device that is included in the first group of network devices; and provide, based on provisioning the plurality of network devices, the one or more packets, associated with a traffic flow, to a network device, of the first group of network devices, based on the control information.

2. The gateway device of claim 1, where the control information identifies a selected route for routing the one or more packets to the destination device,
the selected route identifying the plurality of network devices; and
where, when provisioning the plurality of network devices, the one or more processors are to:
provision the plurality of network devices based on the selected route.

3. The gateway device of claim 2, where the selected route includes at least one of:
a first route selected by a user; or
a second route automatically selected based on a particular network attribute, associated with the second route, satisfying one or more criteria.

4. The gateway device of claim 2, where, when provisioning the plurality of network devices, the one or more processors are to:
establish the selected route by provisioning the plurality of network devices; and
determine whether the selected route satisfies one or more criteria;
when the selected route satisfies the one or more criteria, the one or more processors are further to:
terminate a previous route associated with the traffic flow; and
when the selected route does not satisfy the one or more criteria, the one or more processors are further to:
terminate the selected route; and
provide the one or more packets via the previous route.

5. The gateway device of claim 1, where, when providing the one or more packets, the one or more processors are to:
drop a first packet, associated with the traffic flow, based on the control information; and
provide a second packet, associated with the traffic flow, based on the control information.

6. The gateway device of claim 1, where the network attribute identifies at least one of:
a condition associated with the first network;
a capability associated with the first network;
an amount of traffic associated with the first network;
a bandwidth associated with the first network;
a protocol associated with the first network;
a quantity of traffic flows associated with the first network;
a packet loss associated with the first network;
a jitter associated with the first network;
a latency associated with the first network;
a duration of one or more traffic flows associated with the first network;
an availability of one or more network devices associated with the first network;
a network service provider associated with the first network; or
a cost associated with routing the one or more packets over the first network.

7. The gateway device of claim 1, where the first network and the second network utilize a different protocol for processing network traffic.

8. A non-transitory computer-readable medium storing instructions, the instructions comprising:
one or more instructions that, when executed by a processor of a gateway device, cause the processor to:
receive, from a user device, information transmitted from the user device to a plurality of network devices associated with a first network,
the information being transmitted to the plurality of network devices before being received by the gateway device;
determine, based on receiving the information, a network attribute associated with the first network;
transmit, to an orchestration device associated with a second network, information that identifies the network attribute;
receive, from the orchestration device, control information that specifies a routing policy, a security policy, or a load balancing policy associated with the first network;
provision the plurality of network devices for routing one or more packets to a destination device based on the control information,
the destination device being different than the plurality of network devices,
the plurality of network devices being provisioned based on information that identifies a first group of network devices, of the plurality of network devices, used for transmitting the one or more packets,
the first group of network devices being determined based on information associated with a second group of network devices of the plurality of network devices,
the first group of network devices being included in a different route to the destination device than the second group of network devices,
the second group of network devices being different than the first group of network devices, and
the second group of network devices including at least one network device that is included in the first group of network devices; and
provide, based on provisioning the plurality of network devices, the one or more packets, associated with a traffic flow, to a network device, of the first group of network devices, based on the control information.

9. The non-transitory computer-readable medium of claim 8, where the control information identifies a selected route for routing the one or more packets to the destination device,
the selected route identifying the plurality of network devices; and
where the one or more instructions, that cause the processor to provision the plurality of network devices, cause the processor to:
provision the plurality of network devices based on the selected route.

10. The non-transitory computer-readable medium of claim 9, where the selected route includes at least one of:
a first route selected by a user; or
a second route automatically selected based on a particular network attribute, associated with the second route, satisfying one or more criteria.

11. The non-transitory computer-readable medium of claim 9, where the one or more instructions, that cause the processor to provision the plurality of network devices, cause the processor to:
establish the selected route by provisioning the plurality of network devices; and
determine whether the selected route satisfies one or more criteria;

when the selected route satisfies the one or more criteria, the non-transitory computer-readable medium includes one or more instructions that cause the processor to:
terminate a previous route associated with the traffic flow; and
when the selected route does not satisfy the one or more criteria, the non-transitory computer-readable medium includes one or more instructions that cause the processor to:
terminate the selected route; and
provide the one or more packets via the previous route.

12. The non-transitory computer-readable medium of claim 8, where the one or more instructions, that cause the processor to provide the one or more packets, cause the processor to:
drop a first packet, associated with the traffic flow, based on the control information; and
provide a second packet, associated with the traffic flow, based on the control information.

13. The non-transitory computer-readable medium of claim 8, where the network attribute identifies at least one of:
a condition associated with the first network;
a capability associated with the first network;
an amount of traffic associated with the first network;
a bandwidth associated with the first network;
a protocol associated with the first network;
a quantity of traffic flows associated with the first network;
a packet loss associated with the first network;
a jitter associated with the first network;
a latency associated with the first network;
a duration of one or more traffic flows associated with the first network;
an availability of one or more network devices associated with the first network;
a network service provider associated with the first network; or
a cost associated with routing the one or more packets over the first network.

14. The non-transitory computer-readable medium of claim 8, where the first network and the second network utilize a different protocol for processing network traffic.

15. A method comprising:
receiving, by a gateway device and from a user device, information transmitted from the user device to a plurality of network devices associated with a first network,
the information being transmitted to the plurality of network devices before being received by the gateway device;
determining, by the gateway device and based on receiving the information, a network attribute associated with the first network;
transmitting, by the gateway device and to an orchestration device associated with a second network, information that identifies the network attribute,
the first network being different from the second network, and
a network topology of the second network being hidden from the first network;
receiving, by the gateway device and from the orchestration device, control information that specifies a routing policy, a security policy, or a load balancing policy associated with the first network;
provisioning, by the gateway device, the plurality of network devices for routing one or more packets to a destination device based on the control information,
the destination device being different than the plurality of network devices,
the plurality of network devices being provisioned based on information that identifies a first group of network devices, of the plurality of network devices, used for transmitting the one or more packets,
the first group of network devices being determined based on information associated with a second group of network devices of the plurality of network devices,
the first group of network devices being included in a different route to the destination device than the second group of network devices,
the second group of network devices being different than the first group of network devices, and
the second group of network devices including at least one network device that is included in the first group of network devices; and
providing, by the gateway device and based on provisioning the plurality of network devices, the one or more packets, associated with a traffic flow, to a network device of the first group of network devices, based on the control information.

16. The method of claim 15, where the control information identifies a selected route for routing the one or more packets to the destination device,
the selected route identifying the plurality of network devices; and
where provisioning the plurality of network devices comprises:
provisioning the plurality of network devices based on the selected route.

17. The method of claim 16, where the selected route includes at least one of:
a first route selected by a user; or
a second route automatically selected based on a particular network attribute, associated with the second route, satisfying one or more criteria.

18. The method of claim 16, where provisioning the plurality of network devices comprises:
establishing the selected route by provisioning the plurality of network devices; and
determining whether the selected route satisfies one or more criteria;
when the selected route satisfies the one or more criteria, the method further comprises:
terminating a previous route associated with the traffic flow; and
when the selected route does not satisfy the one or more criteria, the method further comprises:
terminating the selected route; and
providing the one or more packets via the previous route.

19. The method of claim 15, where providing the one or more packets comprises:
dropping a first packet, associated with the traffic flow, based on the control information; and
providing a second packet, associated with the traffic flow, based on the control information.

20. The method of claim 15, where the network attribute identifies at least one of:
a condition associated with the first network;
a capability associated with the first network;
an amount of traffic associated with the first network;

a bandwidth associated with the first network;
a protocol associated with the first network;
a quantity of traffic flows associated with the first network;
a packet loss associated with the first network;
a jitter associated with the first network;
a latency associated with the first network;
a duration of one or more traffic flows associated with the first network;
an availability of one or more network devices associated with the first network;
a network service provider associated with the first network; or
a cost associated with routing the one or more packets over the first network.

* * * * *